United States Patent
Putman et al.

(10) Patent No.: US 7,830,047 B2
(45) Date of Patent: Nov. 9, 2010

(54) LINEAR MOTOR GEOMETRY FOR USE WITH PERSISTENT CURRENT MAGNETS

(75) Inventors: Phil Putman, Houston, TX (US); Kamel Salama, Houston, TX (US)

(73) Assignee: The University of Houston System, Houston, TX (US)

( * ) Notice: Subject to any disclaimer, the term of this patent is extended or adjusted under 35 U.S.C. 154(b) by 0 days.

(21) Appl. No.: 12/236,652

(22) Filed: Sep. 24, 2008

(65) Prior Publication Data

US 2009/0072635 A1  Mar. 19, 2009

Related U.S. Application Data

(63) Continuation of application No. 11/149,447, filed on Jun. 9, 2005, now Pat. No. 7,459,807.

(60) Provisional application No. 60/578,272, filed on Jun. 9, 2004.

(51) Int. Cl.
*H02K 33/00* (2006.01)
*F41F 1/02* (2006.01)
*H01L 39/12* (2006.01)

(52) U.S. Cl. ............... 310/12.07; 310/12.22; 310/12.31; 310/14; 310/27; 89/8; 124/3; 505/125; 505/164; 505/876; 505/776

(58) Field of Classification Search ............... 310/12.07, 310/12.21, 12.22, 12.23, 12.32, 13, 27; 89/8; 124/3; 505/125, 164, 776, 806, 876
See application file for complete search history.

(56) References Cited

U.S. PATENT DOCUMENTS 5,294,850 A * 3/1994 Weh et al. ............... 310/13

* cited by examiner

*Primary Examiner*—Quyen Leung
*Assistant Examiner*—David W. Scheuermann
(74) *Attorney, Agent, or Firm*—Robert W. Strozier

(57) ABSTRACT

An electrically powered launcher is disclosed that can accelerate small payloads to orbital velocities. The invention uses a novel geometry to overcome limitations of other design, and allows full exploitation of existing superconducting materials.

12 Claims, 5 Drawing Sheets

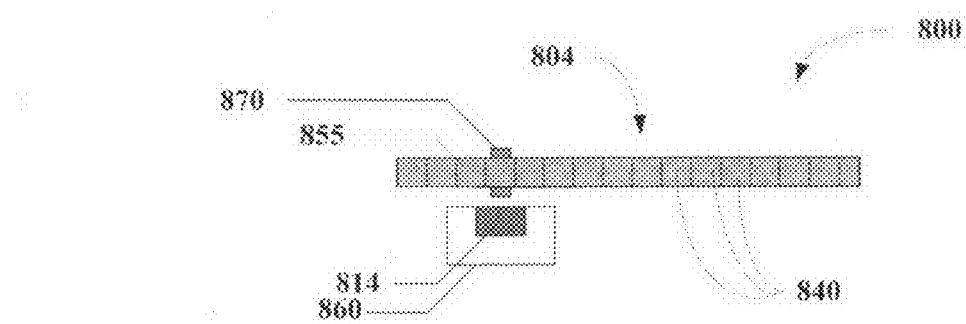
FIG. 8A
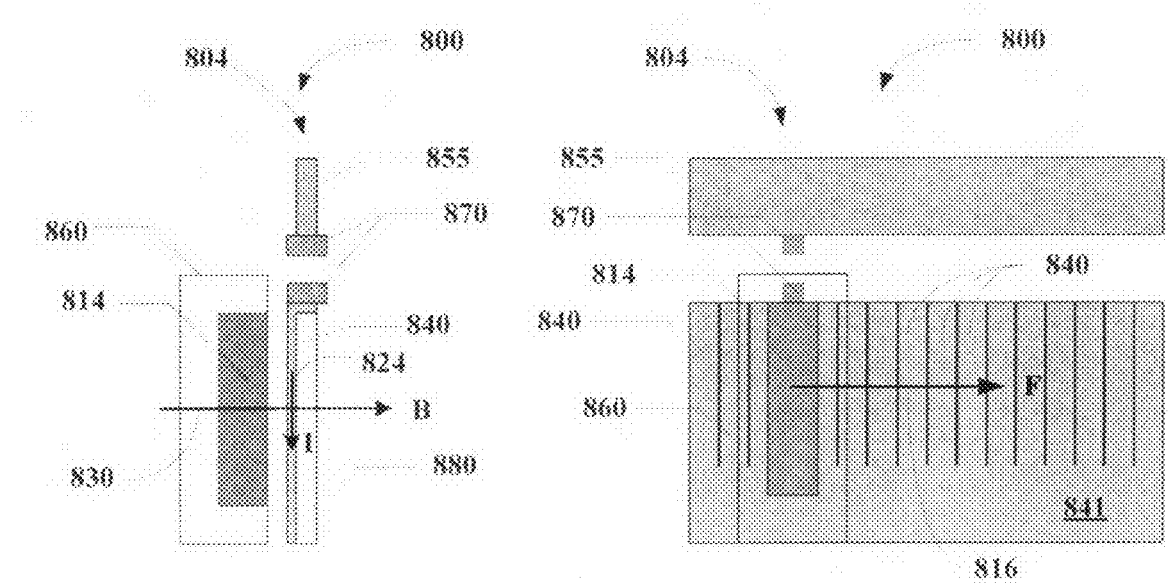
FIG. 8B  FIG. 8C

LINEAR MOTOR GEOMETRY FOR USE WITH PERSISTENT CURRENT MAGNETS

RELATED APPLICATIONS

This application is a continuation and/or a divisional of U.S. patent application Ser. No. 11/149,447, filed 9 Jun. 2005 now U.S. Pat. No. 7,459,807 claims the benefit of and provisional priority to U.S. Provisional Patent Application Ser. No. 60/578,272, filed 9 Jun. 2004.

BACKGROUND OF THE INVENTION

1. Field of the Invention

The present invention relates to a novel linear motor or linear acceleration apparatus.

More particularly, the represent invention relates to a novel linear motor or acceleration apparatus utilizing superconductors in a persistent current mode for both a primary and secondary assemblies. The motor is well-suited as electromagnetic payload launch apparatus or as a projectile launch apparatus because sliding current pickups are not needed for the secondary assembly, the power supply can be arbitrarily small, and no quench or other switching of the primary assembly is necessary during a launch of a payload.

2. Description of the Related Art

Currently, electromagnetic (EM) launch apparatuses include superconducting motors such as the quench gun and collapsing field accelerator and other linear motors, such as the Electromagnetic Aircraft Launch System (EMALS) being developed by Northrop Grumman and General Atomics and chemical guns, such as the Industrial Sounding System from Columbiad.

Although considerable research and developments efforts have directed an EM launch apparatus both for use in payload delivery into space or in projectile delivery in weapons, the art is still in the state of rapid development and is still in need of new, different and possibly improved methods for achieving efficient payload delivery both terrestrial and extra-terrestrial payloads.

The possibility of using electrically powered or electromagnetic (EM) launch apparatus to drastically reduce the cost of placing small payloads in orbit or to delivery small payloads over a large distance has long been known; however, until now, technical obstacles have prevented realization of such launch apparatuses or vehicles. The present invention uses a novel geometry to overcome these technical hurdles, and allows full exploitation of existing superconducting materials.

SUMMARY OF THE INVENTION

The invention is an electrically powered launcher that can accelerate small payloads to orbital and sub-orbital velocities.

The present invention provides an electromagnetic launch apparatus including a primary assembly and a secondary assembly, where the secondary assembly is designed to be accelerated by the primary assembly down a length of the primary assembly in response to electromagnetic fields in the primary assembly and the secondary assembly.

The present invention provides an electromagnetic launch apparatus including a primary assembly having a left element and a right element, each element having a longitudinal slot herein and a secondary assembly comprising a closed loop designed to travels down the longitudinal slots and upon which a payload can be coupled.

The present invention provides an electromagnetic launch apparatus including a primary assembly having a left element and a right element and a secondary assembly comprising a closed loop surrounding the left and right elements and designed to travel down an outside of the primary assembly.

The present invention provides an electromagnetic launch apparatus including a primary assembly having a left element and a right element and a secondary assembly comprising a closed loop disposed between the left and right elements and designed to travel down between the primary assembly.

The present invention provides an electromagnetic launch apparatus including a primary assembly comprising a closed cylindrical conductor and a secondary assembly comprising a magnet designed to travel down an interior of the primary.

The present invention provides an electromagnetic launch apparatus including a primary assembly comprising a plurality of conducting segments, a secondary assembly comprising a magnet designed to travel down the primary adjacent the segments and sliding contacts or a plurality of solid state switches designed to produce a current flow in each successive tooth during a launch cycle.

The present invention provides an electromagnetic launch apparatus including a primary assembly comprising two comb members, each member having a plurality of teeth, a secondary assembly comprising a magnet designed to travel down the primary adjacent the segments and sliding contacts or a plurality of solid state switches designed to produce a current flow in each successive tooth during a launch cycle.

BRIEF DESCRIPTION OF THE DRAWINGS

FIG. 8A-C depict a top view, an end view and a side view of a linear acceleration motor apparatus of this invention.

DETAILED DESCRIPTION OF THE INVENTION

Figure 1A:
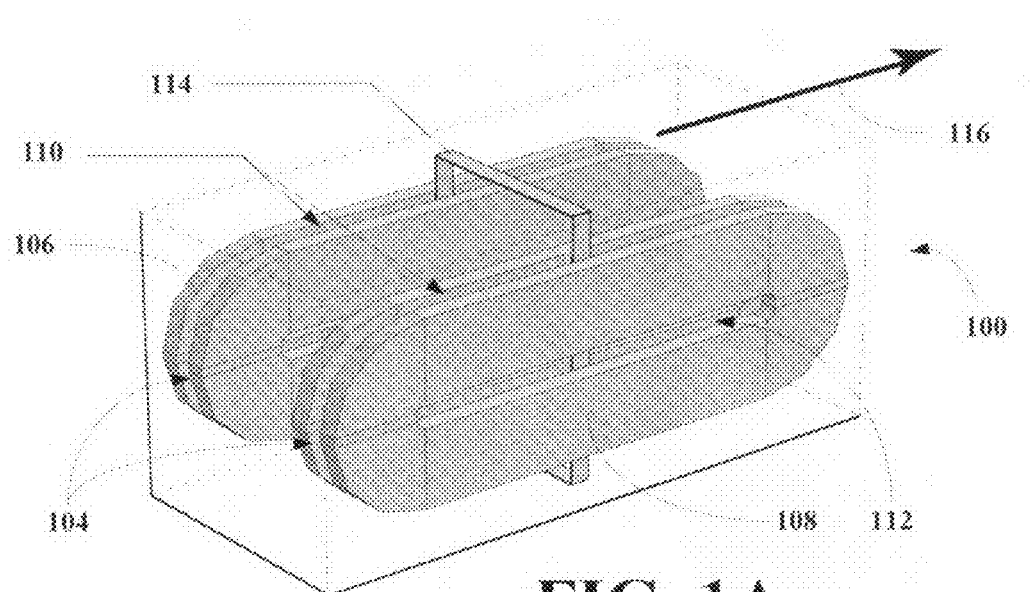
FIGS. 1A-C depict a perspective view and an end view of an embodiment of a linear acceleration motor apparatus of this invention including a primary assembly having a slot and a secondary assembly designed to move in the slot and a view of the magnetic field generated by the apparatus.

The inventors have found that a linear motor can be constructed using superconducting materials that allow the motor to be used as a launching platform for payloads, where the platform can accelerate the payloads to orbital or sub-orbital velocities. The launching platform is, thus, ideally suited for delivery payloads into space or for other application requiring linear acceleration such as electromagnetic guns, cannons, or rocket launchers.

The geometry of the Linear Persistent Current Motor (LPCM) apparatus of this invention is related to existing EM launch concepts. The motor apparatus of this invention includes a wound-secondary with the secondary turned by 90 degrees. The motor apparatus of this invention is similar to an apparatus having two augmented railguns operating in parallel, but with links connecting the railgun armature segments.

The geometry of the LPCM apparatus of this invention has the following advantages: (1) a complete loop in the secondary can operate in persistent current mode, unlike an armature of an augmented railgun; (2) phases of the primary can operate on direct current, or in persistent current mode, unlike the multi-phase AC primary of devices such as the Electromagnetic Aircraft Launch System (EMALS) device; (3) the system as a whole can operate in persistent current mode throughout a launch, without a quench or switching of any kind during a launch. The third advantage means that the launcher apparatus of this invention can be charged gradually with an arbitrarily small power supply, and then, unlike the quench gun or collapsing field accelerator, the apparatus of this invention does not require fast-acting persistent current switches to open primary circuits during a launch cycle. Thus, the LPCM apparatus of this invention overcomes a major obstacle that has prevented adoption of superconducting electromagnetic launchers during the last 20 years.

The primary use of the linear motor apparatus of this invention will be launching small payloads to high altitudes, or, with rocket assist, into orbit or as a launch platform for projectiles to make EM guns, mortars, cannons, rockets or other types of projectiles. The low launch cost of the linear motor system of this invention will make possible new applications, such as assembly of satellites from multiple small payload launches, satellite maintenance and refueling, and space station resupply. The LPCM apparatus of this invention will be superior to competing chemical systems because it allows greater control flexibility, will likely be smaller and lighter, is likely to have higher maximum end speed, will have lower maintenance requirements, and will be safer to operate.

Broadly, the present invention relates to a linear motor apparatus including a primary assembly and a secondary assembly. The secondary assembly is designed to travel along a length of the primary assembly. The secondary assembly is designed to be mechanically linked or coupled to a projectile or payload to be launched. The primary assembly is fixed and is designed to generate a magnetic field that is approximately constant during motor operation and during a launch cycle. The primary assembly includes two sides, where the sides are similar if not identical except that they produce fields having opposite directions. The sides of the primary assembly can comprise any material that is capable of generating a magnetic field, such as superconducting windings operating either in persistent or pulsed current mode, arrays of permanent magnets, copper windings, arrays of monolithic superconductors or the like or mixtures or combinations thereof. Each side of the primary assembly can either be split, i.e., the primary assembly has a slot, where the secondary assembly traveling down the slot or down a middle section of the primary assembly, or a single piece that is either on the inside or the outside of the secondary assembly. The secondary assembly typically be a loop composed of any material that can carry a current, such as superconducting wire, copper wire, a ring-shaped superconducting monolith, or mixtures or combinations thereof. Current can be fed into the secondary assembly from rails, or a flexible conductor, or can be induced by a pulsed magnetic field in the primary assembly. Alternatively, the secondary assembly can include only one segment for each side of the primary assembly, oriented for the desired force on each segment. It should be recognized that the primary and secondary assemblies are the primary and secondary parts of a motor and can be made of any material capable of generating a magnetic field or intrinsically has a magnetic field. Of course, the size and uniformity of the magnetic fields will affect the launch velocity of the apparatus. It should also be recognized that the preferred materials out of which both the primary and secondary assemblies is made are superconducting materials.

The present invention also broadly relates to a method for launching a payload including the step of providing a launch apparatus of this invention. The method also includes coupling or linking a payload with the secondary assembly. Once the payload is coupled to the secondary assembly, the primary assembly is activated and the secondary assembly and the coupled payload is accelerated down a length of the primary assembly. At the end of the primary assembly, the secondary assembly stops and the payload is launched from the apparatus at a specified velocity. If the payload includes a supplemental acceleration component such as a rocket engine, then the method also includes the step of activating the supplemental acceleration component to increase provide additional lift or velocity of the payload. In certain situation, the supplemental acceleration component associated with the payload can be used to aid the payload to reach a desired terminal velocity and/or direction, e.g., the aid the payload reach earth escape velocity for launching payloads into space or into orbit.

Suitable superconducting materials for use in this invention include, without limitation, normal or classical superconducting metal, metal alloys, or mixtures or combinations thereof, high temperature superconductors, or mixtures or combinations thereof. Exemplary examples of high temperature superconductors include, without limitations, LaCu oxides, LaBaCu oxides, LaSrCu oxides, YbaCu oxides, BiSrCaCu oxides, TlBaCaCu oxides, other high Tc superconducting materials or mixtures or combinations thereof. Exemplary examples include $La_{2-x}Ba_xCuO_4$, $La_{2-x}Sr_xCuO_4$, $La_{2-x}Sr_xCaCuO_4$, $YBa_2Cu_3O_{7-\delta}$, $Bi_2Sr_2Ca_2Cu_3O_{10}$, $Bi_2Sr_2Ca$—$Cu_2O_8$, $Bi_2Sr_2Ca_2Ca_3O_8$, $Tl_2Ba_2Ca_2Cu_3O_{10}$, or mixtures or combinations thereof. Preferred HTS includes $YBa_2Cu_3O_{7-\delta}$, $La_{2-x}Sr_xCaCuO_4$, $Bi_2Sr_2Ca_2Ca_3O_8$, $Tl_2Ba_2Ca_2Cu_3O_{10}$, or mixtures or combinations thereof.

Referring now to FIG. 1A, an preferred embodiment of a linear acceleration motor apparatus or launch apparatus, generally 100, is shown to include a housing 102, which houses a primary assembly 104 having a left superconducting element 106 and a right superconducting element 108. The left and right superconducting elements 106 and 108 have a longitudinal slot 110 and a central slot 112. Positioned inside the longitudinal slot 110 is a secondary assembly 114 comprising a superconducting loop. The secondary assembly 114 is designed to travel down a length of the slot 110 in an accelerated fashion. By coupling a payload to the secondary assembly 114 and accelerating the secondary assembly 114 with the coupled payload down the length of the slot 110, the payload can be launched out of the housing in the direction of a launch arrow 116, the direction of motion of the secondary assembly 114 relative to the primary assembly 104.

Figure 1B:
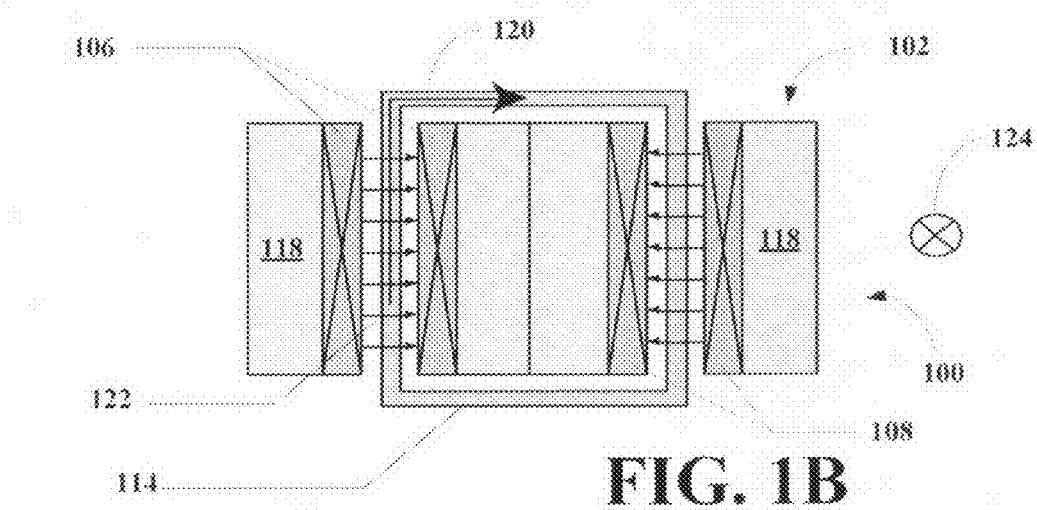

Referring now to FIG. 1B, a start end or start end cross-sectional view of the apparatus of FIG. 1A. The housing 102 is shown as left and right blocks 118. Mounted on the blocks 118 are the left and right superconducting elements 106 and 108. Positioned within the slot 110 is the secondary superconducting loop 114. A direction of a current 120 flowing in the superconducting loop 114 is shown. Lines of magnetic flux 122 across the slot 110 that act on the loop 114. The resulting interaction between magnetic field of the primary assembly 104 and the magnetic field produced by the current 120 flowing in the secondary assembly 114 produces an acceleration direction of motion of the secondary assembly 114 into the plane of the FIG. 1A as shown by a direction indicator 124.

Figure 1C:
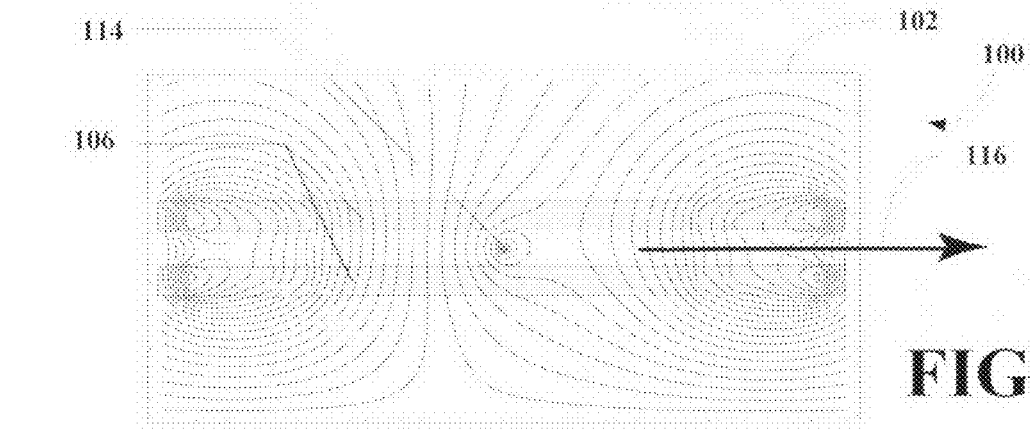

Referring now to FIG. 1C, a diagram of the magnetic lines of flux of the magnetic field produced by one of the elements 106 of the primary assembly 104 and the magnetic field produced by the secondary assembly 114 to produce an acceleration force on the secondary assembly 114 in the direction of the arrow 116.

Figure 2:
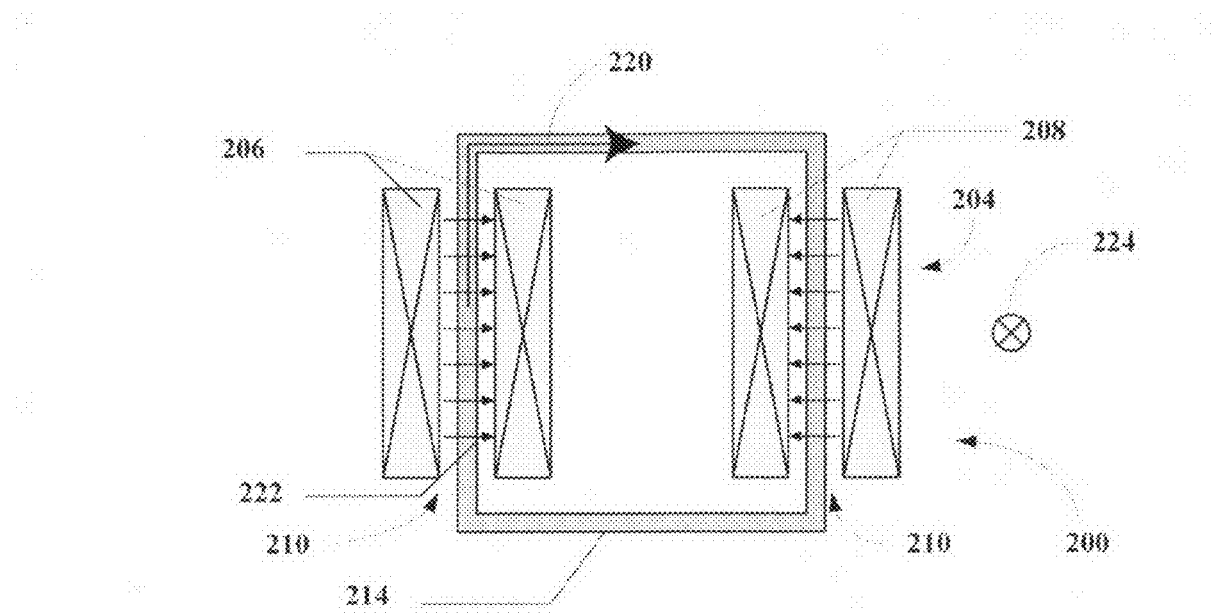
FIG. 2 depicts a block diagram of the linear acceleration motor apparatus of FIG. 1.

Referring now to FIG. 2, another embodiment of a linear acceleration motor apparatus or launch apparatus, generally 200, is shown to include a primary assembly 204 having a left superconducting element 206 and a right superconducting element 208. The left and right superconducting elements 206 and 208 have a longitudinal slot 210. Also shown are the lines and direction of magnetic flux 222 across the slot 210. Positioned inside the longitudinal slot 210 is a secondary assembly 214 comprising a superconducting loop having a current flow direction 220. The secondary assembly 214 is designed to travel down a length of the slot 210 in an accelerated fashion. By coupling a payload to the secondary assembly 214 and accelerating the secondary assembly 214 with the coupled payload down the length of the slot 210, the payload can be launched in the direction of travel of the secondary assembly 214 as indicated by the direction indicator 224, which represents an acceleration vector into the plane of the drawing.

Figure 3:
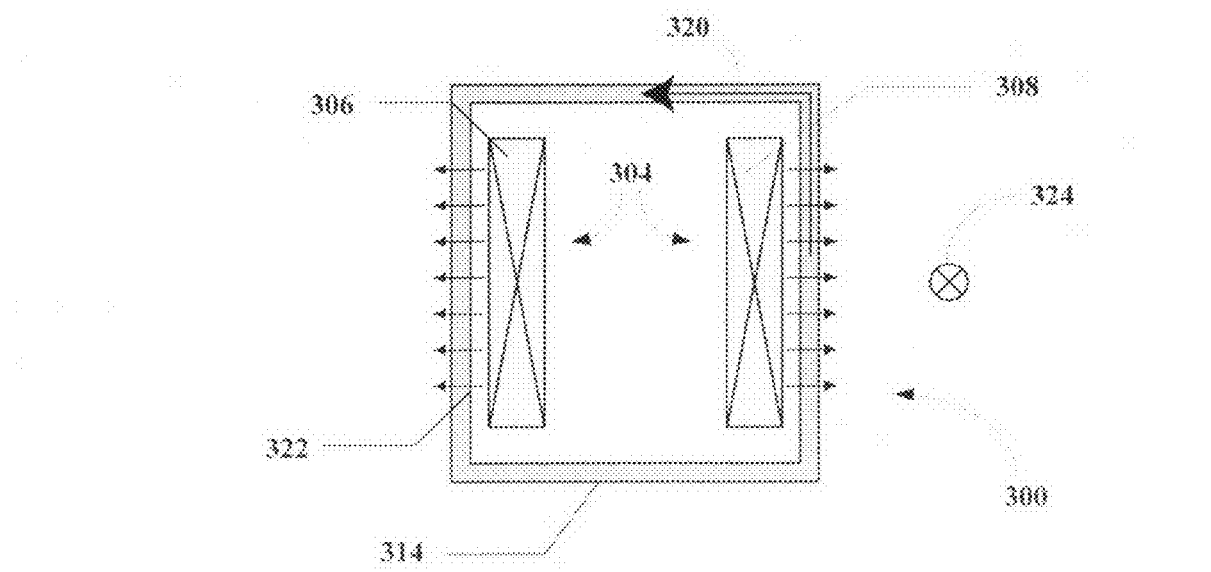
FIG. 3 depicts an illustration of the magnetic line of flux for the apparatus of FIG. 1; A2

Referring now to FIG. 3, another embodiment of a linear acceleration motor apparatus or launch apparatus, generally 300, is shown to include a primary assembly 302 having a left superconducting element 306 and a right superconducting element 308. Also shown are the lines and direction of magnetic flux 322 generated by the elements 306 and 308. The apparatus 300 also includes a secondary assembly 314 comprising a superconducting loop having a current flow direction 220. The primary elements 306 and 308 are disposed in an interior of the secondary assembly 314. By coupling a payload to the secondary assembly 314 and accelerating the secondary assembly 314 with the coupled payload down the length of the primary assembly 302, the payload can be launched in the direction indicated by the direction indicator 324, which represents an acceleration vector into the plane of the drawing.

Figure 4:
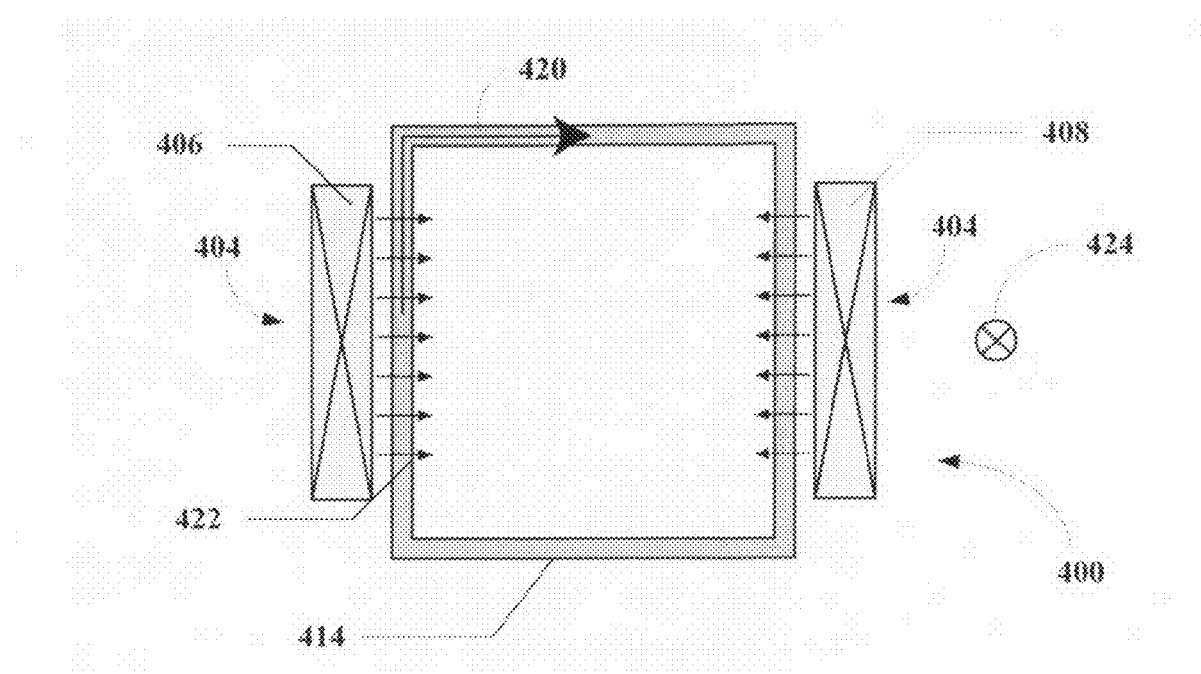
FIG. 4 depicts a block diagram of another embodiment of a linear acceleration motor apparatus of this invention.

Referring now to FIG. 4, another embodiment of a linear acceleration motor apparatus or launch apparatus, generally 400, is shown to include a primary assembly 402 having a left superconducting element 406 and a right superconducting element 408. Also shown are the lines and direction of magnetic flux 422 generated by the elements 406 and 408. The apparatus 300 also includes a secondary assembly 414 comprising a superconducting loop having a current flow direction 420. The primary elements 406 and 408 are disposed in an exterior of the secondary assembly 414. By coupling a payload to the secondary assembly 414 and accelerating the secondary assembly 414 with the coupled payload down the length of the primary assembly 404, the payload can be launched in the direction indicated by the direction indicator 424, which represents an acceleration vector into the plane of the drawing.

Figure 5:
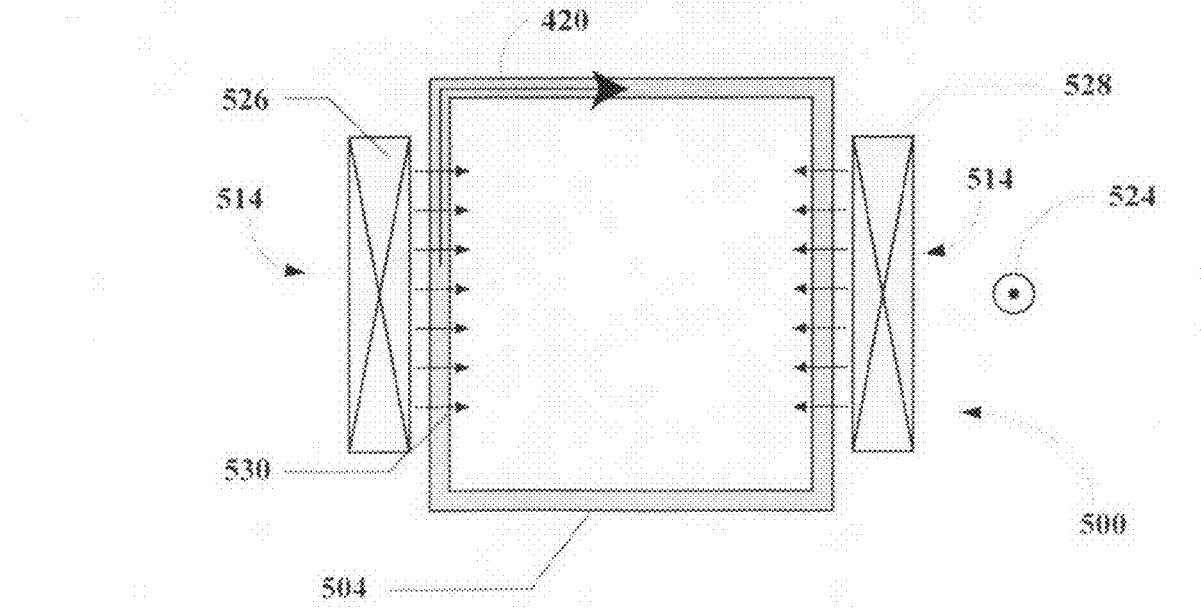
FIG. 5 depicts a block diagram of another embodiment of a the linear acceleration motor apparatus of this invention.

Referring now to FIG. 5, another embodiment of a linear acceleration motor apparatus or launch apparatus, generally 500, is shown to include a primary assembly 504 comprising a superconducting loop having a current flow direction 505. The apparatus 500 also includes a secondary assembly 514 including two superconducting elements 526 and 528. Also shown are the lines and direction of magnetic flux 530 generated by the elements 526 and 528 of the secondary assembly 514. The secondary elements 526 and 528 are disposed on an exterior of the primary assembly 504. By coupling a payload to the secondary assembly 514 and accelerating the secondary assembly 514 with the coupled payload down the length of the primary assembly 504, the payload can be launched in the direction of travel of the secondary assembly 514 as indicated by the direction indicator 524, which represents an acceleration vector out of the plane of the drawing. The apparatus 500 represents an inversion of the apparatus 100. That is, in the apparatus 100, the loop moves relative to the stationary field magnet, while in the apparatus 500, the field magnet moves relative the stationary loop. In the apparatus 500, the secondary assembly 514 is short in length compared to the primary windings 504.

Figure 6:
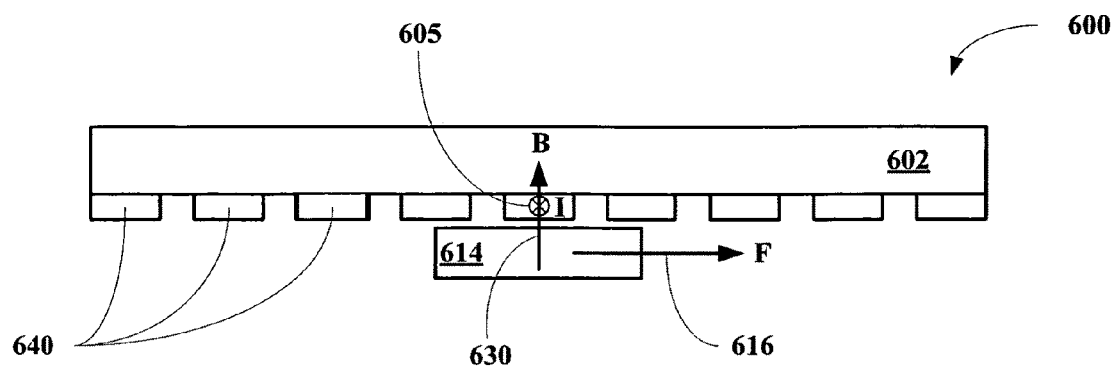
FIG. 6 depicts a block diagram of another embodiment of a the linear acceleration motor apparatus of this invention.

Referring now to FIG. 6, another embodiment of a linear acceleration motor apparatus or launch apparatus, generally 600, is shown to include a primary assembly 602 comprising a plurality of conductor segments 640 having a current flow I in a direction 605. The apparatus 600 is similar to the apparatus 500, but the current loop is replaced by conductor segments fed by sliding contacts as described more fully below. The configuration produces a magnetic force 630 and an acceleration force 616 adapted to accelerate a secondary assembly 614.

Figure 7:
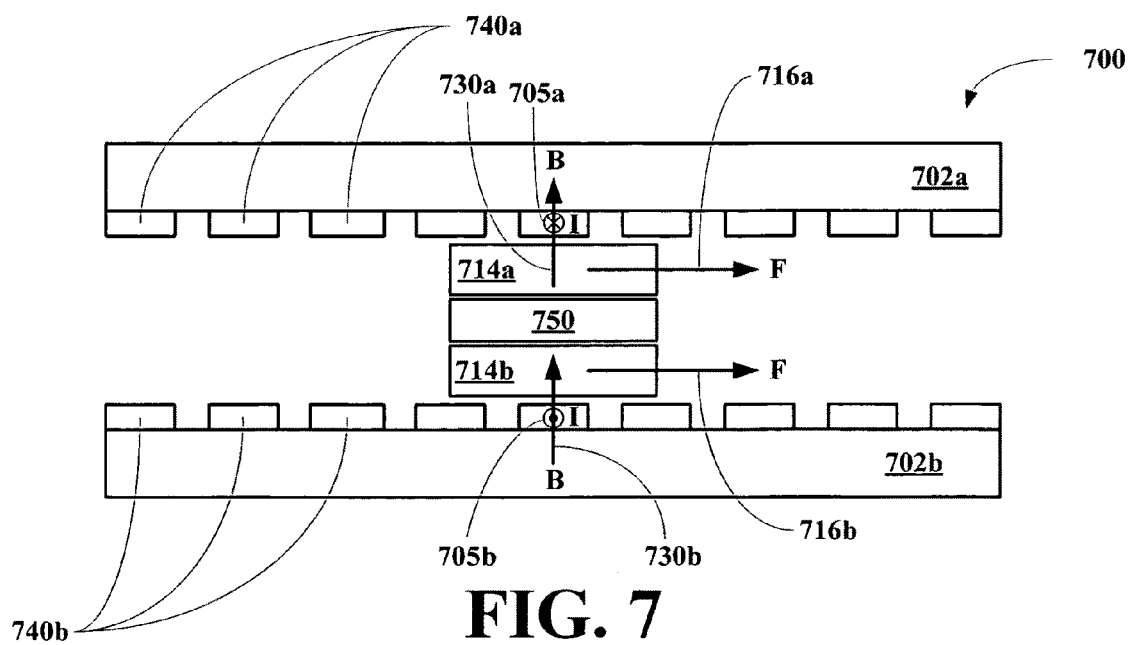
FIG. 7 depicts a block diagram of another embodiment of a the linear acceleration motor apparatus of this invention.

Referring now to FIG. 7, another embodiment of a linear acceleration motor apparatus or launch apparatus, generally 700, is shown to include two primary assemblies 702a&b comprising pluralities of conductor segments 740a&b having a current flow I in directions 705a&b and arranged in a parallel configuration. It should be noted that the current flow direction 705a is opposite to the current flow 705b in the linear elements 740a and 740b, respectively, so that magnetic fields 730a&b are in the same direction. The apparatus 700 also includes two secondary assemblies 714a&b. The configuration produces magnetic forces 730a&b and acceleration forces 716a&b. Two of the alternate configuration motors can be used in parallel. A payload 750 can be placed between the secondary magnets 714a&b, so that a symmetric force is exerted on the payload 750.

Referring now to FIG. 8A-C, another embodiment of a linear acceleration motor apparatus or launch apparatus, generally 800, is shown to include a primary assembly 804. The primary assembly 804 includes a current rail 855, sliding contacts 870, a plurality of conductor tooth segments 840 extending from a base 841, and an insulating support 880. The apparatus 800 also includes a secondary assembly 814 comprising a magnet 815 and a cyrostat 860. The arrow 830 represents the magnetic force B; the arrow 824 represent the direction of current flow I; and the arrow 816 represents the direction of motion of the secondary assembly 814 relative to the primary assembly 804. Although the segments 840 are shown here as being short conduct elements, the segments 840 can also be loops.

In the alternate configuration, the secondary magnet, the two sliding contacts, and the payload are connected by a support structure and move as a unit. One terminal of a power supply (e.g., a capacitor bank) is electrically connected to the current feed rail, while the other terminal of the power supply is connected to the toothed primary. A sliding contact rides on the current feed rail, and is electrically connected to another sliding contact that rides the toothed part of the primary. The sliding contact that rides the toothed part of the primary is narrower than a tooth, so that current is fed from the current feed rail, through the sliding contacts, through a single tooth, and returns to the power supply. Each tooth in the primary is preferably narrower than the secondary magnet. The field magnets can comprise either permanent magnets, monolithic superconductors with a trapped field, or a wound superconducting magnet operating in persistent current mode or mixtures and combinations thereof. The toothed part of the primary can comprise a sheet of a good conductor such as copper or aluminum, or superconductors in tape or wire form or mixtures and combinations thereof. The sliding contacts can comprise carbon, copper, other metals or alloys with good conductivity, or a composite of carbon and metal or alloy or mixtures and combinations thereof. The toothed part of the primary is supported by an insulating material, such as polycarbonate or G10 or other similar structural insulators. If a superconducting magnet is used in the secondary, it should be contained in a cryostat that maintains a low temperature during a launch. Variations of this configuration are possible. The current feed rail can be placed in other locations relative to the toothed part of the primary. Multiple secondary magnets can be used, along with multiple sliding contacts. The secondary assembly can be supported by rolling bearings, low friction pads such as PTFE, or by a magnetic levitation structure that is either independent of or makes use of the field magnets.

The main advantage of the alternate configuration is that it takes advantage of the very high magnetic fields (up to 17 T) that have been demonstrated in small superconducting monoliths. Although this configuration uses a sliding contact, while the others do not, this is thought to be acceptable because sliding contacts have been demonstrated in rail guns to work up to a speed of about 6 km/s. At this speed, energy transfer becomes extremely inefficient (near zero percent efficiency). However, the configuration presented here differs from a rail gun in two important ways:

1. The sliding contacts in a rail gun are in a high magnetic field regions. In the alternate configuration, the contacts need not be in a high field regions; additionally, a tailored magnetic field can be applied in this case in order to contain any generated plasma in the regions of the contact.
2. In a rail gun, a significant pressure is exerted on the area of the sliding contact. In this configuration, the sliding contact is only required to support its own mass.

It is therefore expected that this configuration can accelerate payloads to speeds significantly higher than 6 km/s.

Another advantage of the alternate configuration is that the inductance of the toothed primary is very low. This minimizes the energy that must be dissipated as the sliding contact commutates current from one tooth to the next. It also provides the possibility of using solid-state switches rather than sliding contacts to control current in the teeth. In solenoidal coil guns, the inductance of the coils combined with the switch voltage limit is one of the main limitations of these types of devices achieving launch velocities.

A prototype of the alternate configuration has been constructed, and demonstrated to accelerate a payload. To date, the prototype has been used with permanent magnets in the secondary, but has been designed so that these permanent magnets can be replaced by existing monolithic superconducting magnets. The acceleration and back electromotive force measured during tests were found to agree with theoretical predictions.

We claim:

1. A linear motor apparatus comprising:
    a primary assembly including a left side element and a right side element, each element including a longitudinal slot,
    a secondary assembly comprises a closed loop, where a left side of the loop is disposed in the longitudinal slot of the left side element and a right side of the loop is disposed in the longitudinal slot of the right side element and where the loop is perpendicular to a direction of launch,
    a payload coupled to the secondary assembly,
    where the secondary assembly is accelerated down a length of the primary assembly when a current is applied to the secondary assembly and where the payload is launched when the secondary assembly reaches a distal end of the primary assembly.

2. The apparatus of claim 1, wherein current is fed to the secondary assembly by rails.

3. The apparatus of claim 1, wherein the primary assembly comprises normal conductors, permanent magnets or mixtures or combinations thereof.

4. The apparatus of claim 1, wherein the secondary assembly has a current induced in it by a pulsed magnetic field at the beginning of a launch.

5. The apparatus of claim 1, wherein each element includes a central slot perpendicular to the longitudinal slot.

6. The apparatus of claim 1, further comprising a housing supporting the primary assembly.

7. The apparatus of claim 1, wherein the elements of the primary assembly comprise a superconducting material, where the superconducting material comprises a superconducting metal, a superconducting metal alloy, a high temperature superconductor, or a mixture or a combination thereof.)

8. The apparatus of claim 7, wherein the high temperature superconductor comprises a LaCu oxide, a LaBaCu oxide, a LaSrCu oxide, a YbaCu oxide, a BiSrCaCu oxide, a TlBaCaCu oxide, another high Tc superconducting material or a mixture or a combination thereof.

9. The apparatus of claim 1, wherein the secondary assembly comprises a superconducting material, where the superconducting material comprises a superconducting metal, a superconducting metal alloy, a high temperature superconductor, or a mixture or a combination thereof.

10. The apparatus of claim 9, wherein the high temperature superconductor comprises a LaCu oxide, a LaBaCu oxide, a LaSrCu oxide, a YbaCu oxide, a BiSrCaCu oxide, a TlBaCaCu oxide, another high Tc superconducting material or a mixture or a combination thereof.

11. The apparatus of claim 1, wherein the elements of the primary assembly and secondary assembly comprise a superconducting material, where the superconducting material comprises a superconducting metal, a superconducting metal alloy, a high temperature superconductor, or a mixture or a combination thereof.

12. The apparatus of claim 11, wherein the high temperature superconductor comprises a LaCu oxide, a LaBaCu oxide, a LaSrCu oxide, a YbaCu oxide, a BiSrCaCu oxide, a TlBaCaCu oxide, another high Tc superconducting material or a mixture or a combination thereof.

* * * * *